United States Patent [19]

Traw et al.

[11] Patent Number: 5,274,768
[45] Date of Patent: Dec. 28, 1993

[54] HIGH-PERFORMANCE HOST INTERFACE FOR ATM NETWORKS

[75] Inventors: Brendan S. Traw, Bridgewater, Mass.; Jonathan M. Smith, Metuchen, N.J.

[73] Assignee: The Trustees of the University of Pennsylvania, Philadelphia, Pa.

[21] Appl. No.: 708,775

[22] Filed: May 28, 1991

[51] Int. Cl.$^5$ .............................. G06F 13/00
[52] U.S. Cl. ...................... 395/275; 395/200; 370/94.1
[58] Field of Search .............. 364/DIG. 1, DIG. 2; 370/60, 85.2, 94.1, 60.1, 85.13; 395/275, 200

[56] References Cited

U.S. PATENT DOCUMENTS

| | | | |
|---|---|---|---|
| 4,975,906 | 12/1990 | Takiyasu et al. | 370/85.13 |
| 5,012,466 | 4/1991 | Buhrke et al. | 370/62 |
| 5,101,404 | 3/1992 | Kunimoto et al. | 370/60 |
| 5,130,984 | 8/1992 | Hedlund | 370/94.1 |
| 5,136,584 | 8/1992 | Hedlund | 370/94.1 |
| 5,144,622 | 9/1992 | Takiyasu et al. | 370/85.13 |

OTHER PUBLICATIONS

Israel Cidon and Inder S. Gopal, "Paris: An Approach To Integrated High-Speed Private Networks," Int'l. Journal of Digital and Analog Cabled Systems, vol. 1, 77-85 (1988).
Bruce S. Davie, "Host Interface Design for Experimental, Very High-Speed Networks".
Anna Hac and Hasan B. Mutlu, "Synchronous Optical Network and Broadband ISDN Protocols," IEEE (1989).
Martina Zitterbart, "High-Speed Transport Components," IEEE Network Magazine, Jan. (1991).
Special Report, "Gigabit Network Testbeds," Computer, Sep. (1990).
H. Abu-Amara, et al., "PSi: A Silicon Compiler For Very Fast Protocol Processing".
Arnould et al., "The Design of Nectar: A Network Backplane for Heterogeneous Multicomputers," Jan. (1989) CMU-CS-89-101.
Cooper et al., "Protocol Implementation on the Nectar Communication Processor," (1990).
H. B. Bakoglu, T. Whiteside, "RISC System/6000 Hardware Overview".
Israel Cidon, Inder S. Gopal, "Paris: An Approach to Integrated High-Speed Private Networks," Int'l Journal of Digital and Analog Cabled Systems, vol. 1 77-85 (1988).
Greaves et al., "The Cambridge Backbone Ring," IEEE Infocom Feb. (1990).
Hopper et al., "Pandor-an Experimental System for Multi-Media Applications".
Advanced Micro Devices, 256×48 Content Addressable Memory (CAM) Pub. 08125, Rev. C, Aug. (1988).
Am99C10 256×48 Content Addressable Memory Pub. No. DE125.
EPM5127 Data Sheet.
EMP5024 Data Sheet.
Deep First-In First-Out (FIFO) 512×9 CMOS Memory Pub. No. 10175 (Aug. 1988).
CHIPS 82C611,82C612 Micro CHIPS: Micro Channel Interface Parts (1988).

Primary Examiner—Robert L. Richardson
Attorney, Agent, or Firm—Woodcock Washburn Kurtz Mackiewicz & Norris

[57] ABSTRACT

A host interface 1 for an asynchronous transfer mode (ATM) network comprises a Segmenter 2 and Reassembler 3. The host interface 1 is connected to a Sunshine ATM switch 7 via an electrical to optical converter 6 and an IBM RS/6000 workstation 4 via a MicroChannel bus 5. The Reassembler 3 comprises three components, respectively referred to as the Linked List Manager, Dual Port Reassembly Buffer and SONET Interface and VCI Lookup Controller, that are capable of concurrent operation once they are initialized and configured. Those components are capable of reassembling an ATM cell in less than 2.7 microseconds.

12 Claims, 13 Drawing Sheets

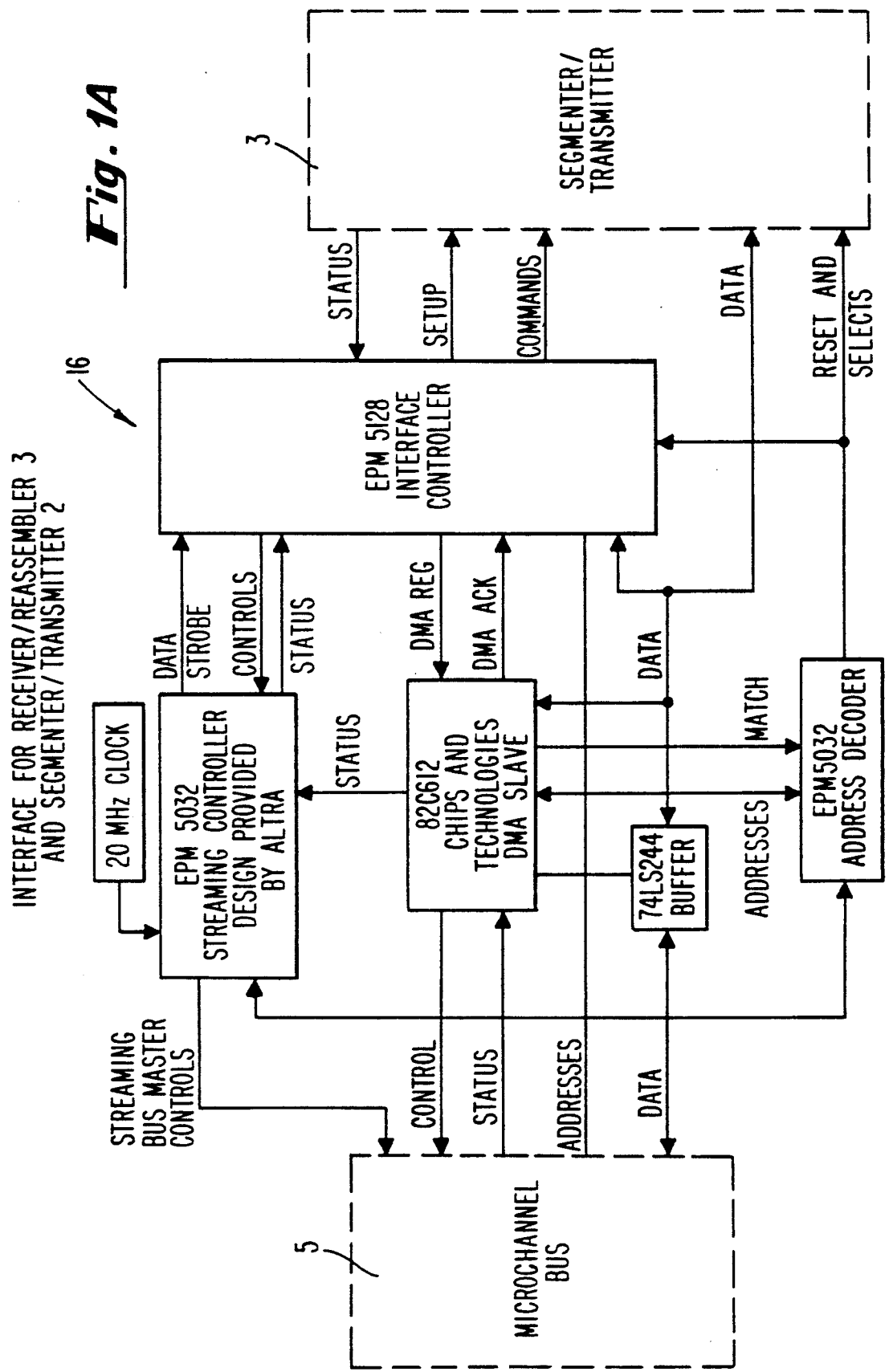

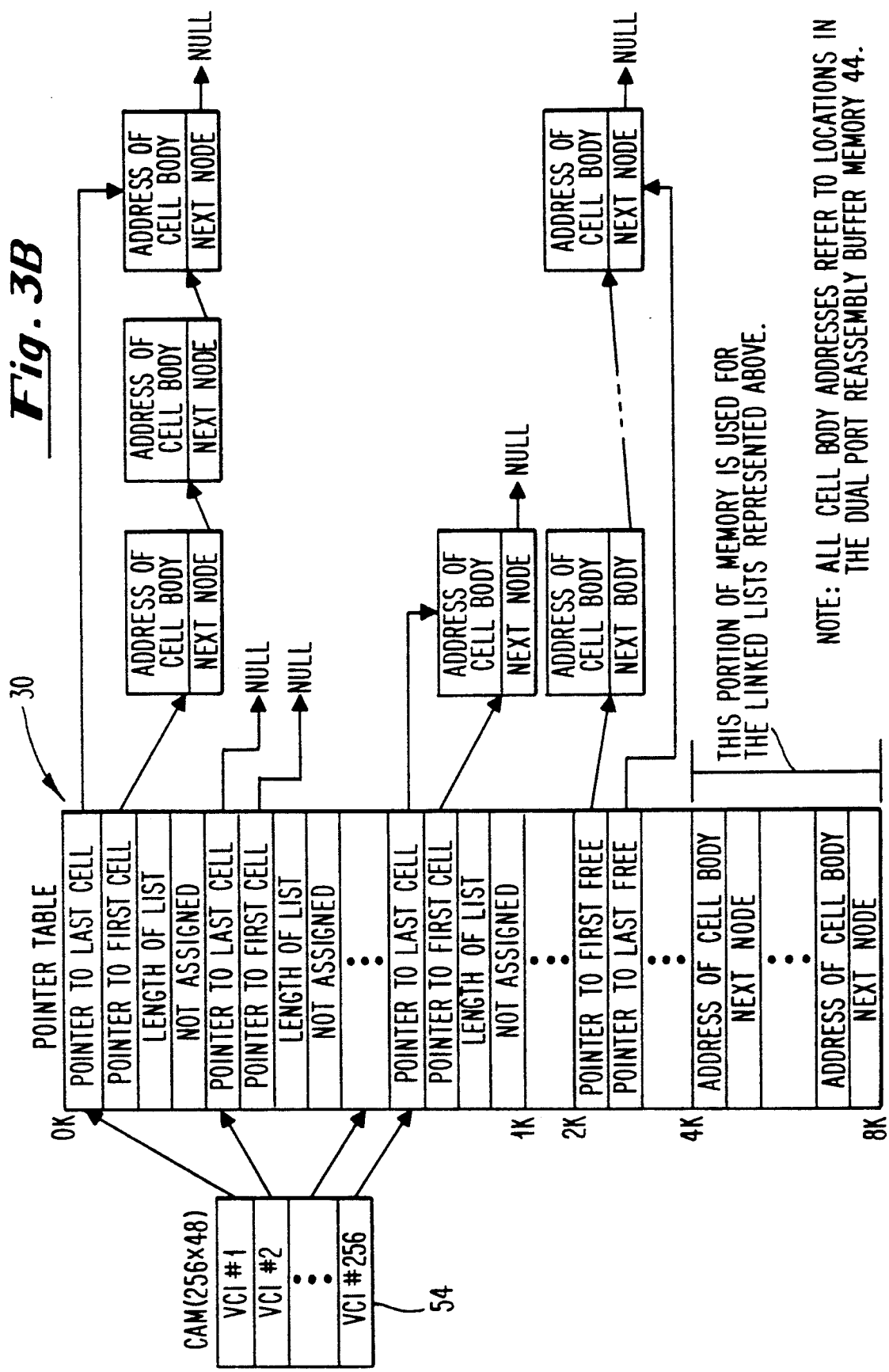

HIGH-PERFORMANCE HOST INTERFACE FOR ATM NETWORKS

FIELD OF THE INVENTION

The present invention generally relates to the fields of computers and communications networks. More particularly, the present invention relates to an interface between a network element, such as a host computer, and a telecommunications network.

BACKGROUND OF THE INVENTION

Computer technology is reaching the point where a host computer system, such as a workstation, will be able to produce or consume data at close to 1 Gbps. High speed telecommunications networks (such as the Broadband-Integrated Digital Services Network (B-ISDN)) capable of transporting data at that speed are also becoming available. However, a major bottleneck exists at the interface between the host computer and the network. Two main functions are performed at this point:

1. data is converted between a format useful to the host computer and the format that is required by the network;
2. data is moved between the host computer's memory and the network. See copending application Ser. No. 660,637, filed Feb. 25, 1991.

The amount of processing power required to perform those functions at a speed sufficient to load a Gbps network is unavailable in most computers. Previous approaches to solving this problem employ front-end "protocol engines" to off-load some of the processing from the host computer. See e.g., E. A. Arnould, et al., "The Design of Nectar: A Network Backplane for a Heterogeneous Multi-computer," Technical Report CMU-CS-89-101, Computer Science Dept., CMU, (January, 1989); R. Reach, "Ultranet: An Architecture for Gigabit Networking," Local Computer Networks, pp. 232-248, Minneapolis, Minn., (October, 1990); H. Kanakia and D. Cheriton, "The VMP Network Adapter Board (NAB): High-performance Network Communication for Multiprocessors," Proc. ACM SIGCOMM '88, pp. 175-187, Stanford, Cal. (August 1988); H. Kanakia, "High Performance Host Interfacing for Packet Switched Networks," Ph.D. thesis, Stanford University, (November, 1989); G. Chesson "XTP/PE Overview," Proc. 13th Con. on Local Computer Networks, pp. 292-296, Minneapolis, Minn., (October, 1988). In addition, previous approaches to this problem are based on very large packet sizes (1 Kbyte to 32 Kbytes), thus those approaches are not suitable for use with a telecommunications network that utilizes the Asynchronous Transfer Mode (ATM) transmission technique.

According to the ATM technique, data is transmitted in 53-byte packets called cells. With 53-byte cells, headers must be generated and processed at a far more rapid rate than when packets are 1-32 Kbytes. The prior art approaches to interfacing a host computer to a telecommunications network at gigabit speeds do not process headers fast enough to be useful to interface a computer with an ATM network.

The ATM is a transmission technique for transmitting data belonging to a variety of applications across a network. An important advantage of the ATM technique is that it provides a single transmission format by which data from a variety of network element sources (such as voice, high definition video, and computer and terminal connections) may be transmitted in a single transmission format, rather than requiring separate transmission formats and processing facilities for each type of data.

Each 53-byte ATM cell comprises 48 bytes of payload and a 5-byte ATM header. The header includes a Virtual Channel Identifier (VCI) that indicates the particular channel or connection to which the cell belongs; it is used to direct the cell at the various switching points in the network. The ATM cell header also includes a Cyclic Redundancy Check (CRC) byte. The 48-byte payload may also contain a 4-byte Adaptation Layer header the contents of which depend on the application.

The ATM cells are transmitted in slots defined in the payload fields of, e.g., the frames of the SONET STS-3c signal (155 Mbps) or the SONET STS-12 signal (622 Mbps), which may be formed by multiplexing four STS-3c signals. An OC-48 optical signal may be used to achieve transmission rates of over 2 Gbps.

The ATM technique is referred to as being asynchronous because the slots in the frames of the signals are not reserved for the cells of particular applications, but instead are filled by the cells of various applications in accordance with the various applications' current demand for slots and the current availability of slots. The ATM transmission technique is expected to be the standard for providing broadband telecommunications services through a broadband trunk and exchange network such as the B-ISDN.

As mentioned above, the interface between a host computer and the network presents a severe bottleneck when attempting to move data at Gbps speeds. Interface (or protocol) architectures can be viewed as a stack of layers. The ISO OSI model, for example, consists of seven layers. The "highest" layer, the application layer, is the application program interface (API) to the network. The physical layer is the hardware that connects the node to the network medium. The intervening layers perform additional functions, such as reliable delivery, connection management, etc., as required by the API. See, e.g., A. Tannenbaum, *Computer Networks*.

There are several research projects directed to providing high-performance host interfaces. The major difference between the respective implementations of the projects is the number of protocol processing functions performed by the host interface. One important focal point has been the development of interfaces that accelerate transport protocol processing. See M. Zitterbart, "High-Speed Transport Components," *IEEE Network*, pp. 54-63 (January, 1991).

Kanakia and Cheriton's VMP Network Adapter Board serves as a hardware implementation of Cheriton's Versatile Message Transaction Protocol (VMTP). See H. Kanakia and D. Cheriton, "The VMP Network Adapter Board (NAB): High Performance Network Communication for Multiprocessors," *Proceedings, SIGMETRICS '88* (1988).

Abu-Amara et al. are capable of targeting any set of protocol layers (to the degree that they can be precisely specified) with their PSi silicon compiler approach. With that method, the protocol is specified using a symbolic programming language and mask descriptions for fabrication process layers are generated as output of a compiler. The masks are then used to create custom hardware. See H. Abu-Amara, et al., "PSi: A Silicon Compiler for Very Fast Protocol Processing," Protocols for High Speed Networks, ed. R. C. Williamson, North-Holland (1989).

The Nectar Communications Accelerator Board (CAB) may be programmed with various protocols. The CAB communicates with the host memory directly and the programmability can conceivably be used by applications to customize protocol processing. See E. A. Arnould, et al., "The Design of Nectar: A Network Backplane for Heterogeneous Multicomputers," Proceedings, ASPLOS-III pp. 205-216 (April, 1987).

Cooper et al. have reported that TCP/IP and a number of Nectar-specific protocols have been implemented on the CAB connected to Sun-4 processors. See E. Cooper, et al., "Protocol Implementation on the Nectar Communication Processor," Proceedings, SIGCOMM '90, Philadelphia, Pa. pp. 135-144 (Sep. 24-27, 1990).

Davie of Bellcore has reported on a host interface designed for the TurboChannel bus of the Dec Station 5000 workstation. That design relies on an Intel 80960 RISC microController to perform the protocol processing and flow control for a trunk group of four STS-3c lines (622 Mbps). See B. S. Davie, "Host Interface Design for Experimental, Very High Speed Networks," Proc. Compcon Spring '90, San Francisco, Cal. pp. 102-106 (February 1990); B. S. Davie, "A Host-Network Interface Architecture for ATM," Proceedings, SIGCOMM 1991, Zurich, Switzerland (Sep. 4-6, 1991).

The IBM RS/6000 workstation is one example of a host computer for which an interface in accordance with the present invention is suitable. The RS/6000 workstation has a 32-bit MicroChannel bus for I/O interconnections. Transfers may be either 8, 16, or 32 bits wide. The basic cycle time for the bus is 200 ns, but with data streaming a single 100 ns setup time may be amortized over many transfers. The streaming operation starts out as a basic transfer cycle. After the transfer has been set up, the slave acknowledges that it may support a streaming transaction, which enables the master to then start the 10 Mhz streaming strobe. A data transfer may then be made every 100 ns. No addressing information is generated by the master while the stream is in progress. Streaming may be terminated or paused by either the slave or the master. See H. B. Bakoglu, et al., "The IBM RISC System/6000 Processor: Hardware Overview," IBM *Journal of Research and Development* 34(1), pp. 12-22 (January, 1990).

A goal of the present invention is to provide an interface between a network element and a telecommunications network that operates at near Gbps speeds and that is compatible for use with the ATM transmission technique. A further goal of the present invention is to provide an interface that is capable of receiving data from a network element, such as a host computer, and segmenting it into ATM cells for transmission over a telecommunications network. A still further goal of the present invention is to provide an interface that is capable of receiving and reassembling segmented ATM data for use by the network element. A yet further goal of the present invention is to provide a high-performance interface for an IBM/6000 workstation host in an ATM telecommunications network.

SUMMARY OF THE INVENTION

These goals are achieved by the present invention, according to which a reassembler for reassembling received ATM data that has been segmented into a plurality of cells, each of which comprises a VCI and a cell body, comprises first means for separating each cell body from its corresponding VCI and determining respective linked list reference addresses for the VCIs, Reassembly Buffer means for storing the cell bodies, and Linked List Manager means for storing linked list data indicative of addresses at which the cell bodies are stored in the Reassembly Buffer means.

In one preferred embodiment the Linked List Manager means comprises Pointer Table means for storing the linked list data and Linked List Controller means for removing linked list data from the Pointer Table means and writing/reading linked list data to/from the Pointer Table means.

In another preferred embodiment the Reassembly Buffer means comprises Reassembly Memory means for storing the cell bodies and Dual Port Controller means for writing/reading cell bodies to/from the Reassembly Memory means.

In yet another preferred embodiment the first means comprises Cell Manager means for separating each cell body from its corresponding VCI and detecting whether the VCI has been corrupted, CAM means for storing the VCIs and providing pointers into the linked list data, and VCI Lookup Controller means for writing VCIs to the CAM means.

In yet another preferred embodiment the first means, Reassembly Buffer means and Linked List Manager means are adapted for parallel operation.

The present invention also encompasses interfaces that comprise Segmenter means for segmenting data from a network element into a plurality of ATM cells and transmitting those cells onto the ATM network, and Reassembler means in accordance with the foregoing description for reassembling received ATM data.

The present invention also encompasses systems comprising a network element, a telecommunications network, and reassembler means, in accordance with the foregoing description, for receiving and reassembling ATM data from the network.

In one specific embodiment, the network element is another network.

Preferred embodiments of the invention provide a "common denominator" set of services that may be used to support a complete range of higher level protocols. Those services have been inexpensively and efficiently implemented by limiting the interface to a collection of base services. Other features of the invention are described below in connection with the detailed description.

BRIEF DESCRIPTION OF THE DRAWINGS

FIG. 1A is a block diagram of an interface 16 of Reassembler 3 of Host Interface 1 of FIG. 1.

FIG. 3B depicts the format of the linked lists stored in, and a memory map for, the Pointer Table memory 30 of the Linked List Manager 10.

DETAILED DESCRIPTION OF PREFERRED EMBODIMENTS

The following detailed description of the preferred embodiment refers to the attached drawings and is intended to make the invention properly understood by way of example without any limitation being implied.

Figure 1:
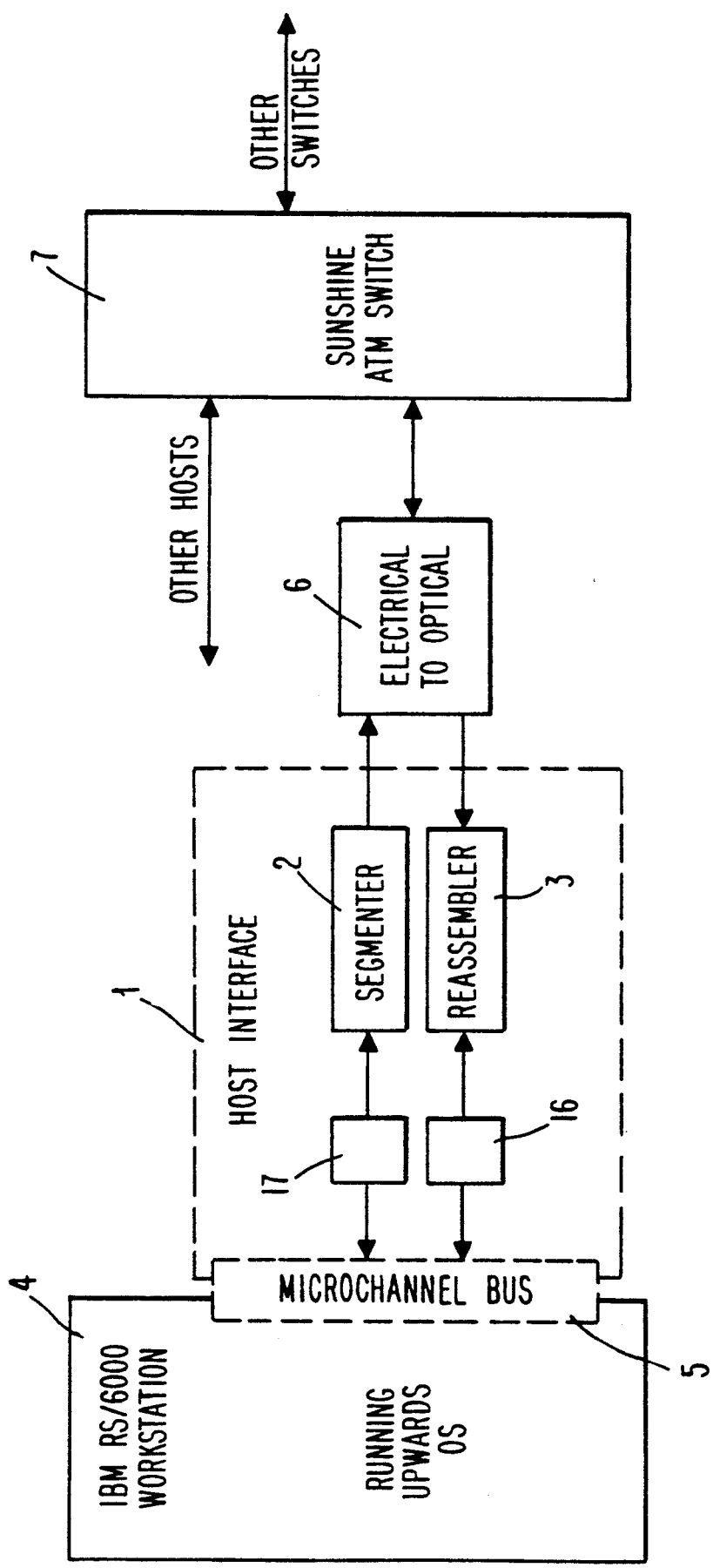
FIG. 1 is a partial block diagram of a computer network in accordance with the present invention.
Figure 1B:
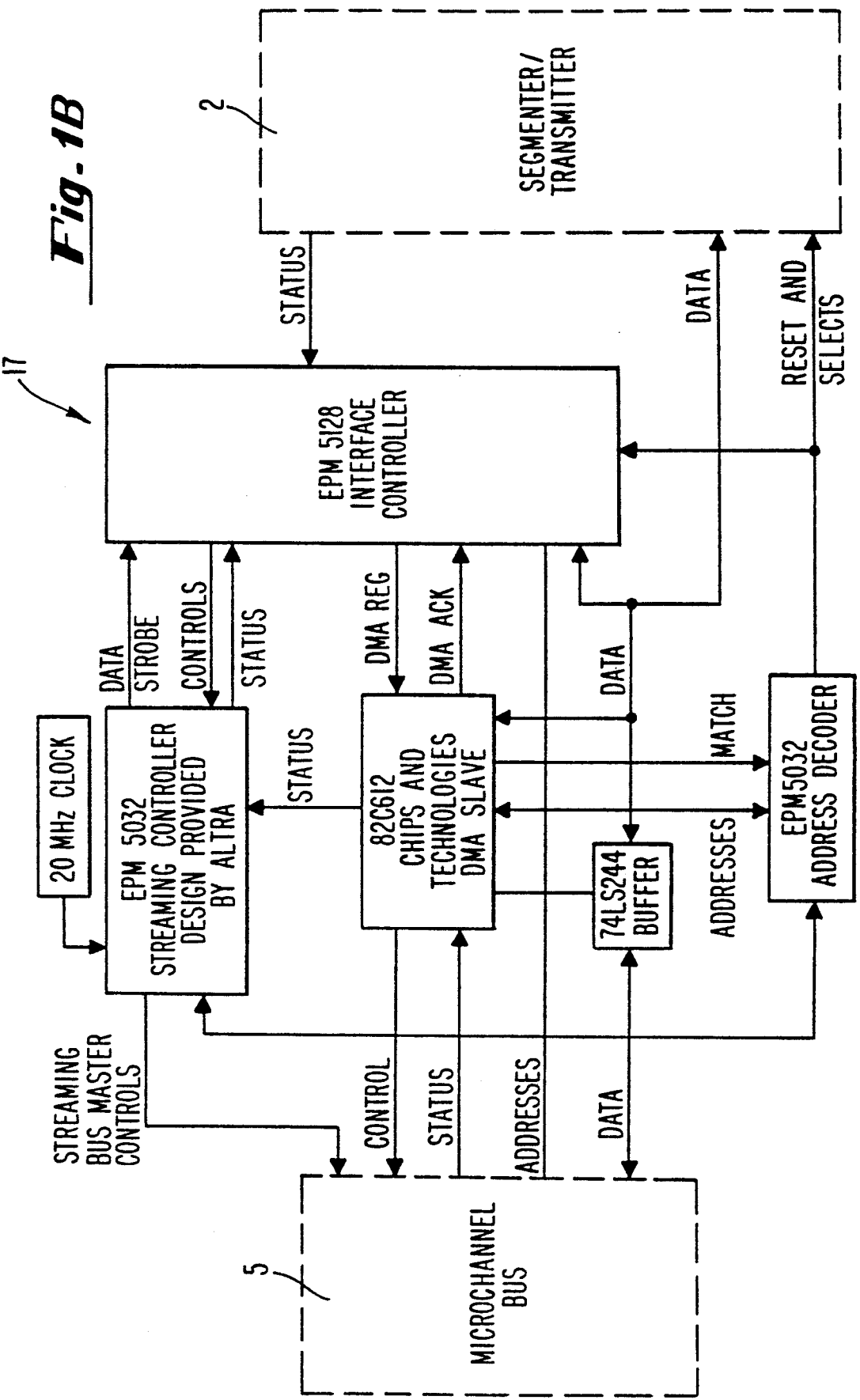
FIG. 1B is a block diagram of an interface 17 of Segmenter 2 of Host Interface 1.

FIG. 1 is a partial block diagram of a computer network in accordance with the present invention. The invention is embodied in a host interface 1 comprising a Segmenter 2, MicroChannel interface card 16, Reassembler 3 and MicroChannel interface card 17 (16 and 17 are shown in FIGS. 1A, 1B), which may be combined on one wire-wrapped card if double-sided surface-mount fabrication techniques are used. The MicroChannel interfaces 16, 17 are based on a Chips and Technologies 82C612 DMA slave interface. Additional logic, which includes one EPM5128 and two EPM5032 programmable logic devices (PLDs), provides the capabilities of streaming bus mastering and extensive address decoding. Those capabilities are important because the MicroChannel interface card provides a burst bus bandwidth of 320 Mbps, as opposed to the 160 Mbps bandwidth provided by typical DMA interfaces.

The host interface 1 is connected to a Sunshine ATM switch 7 via an electrical to optical converter 6 and an IBM RS/6000 workstation 4 via a MicroChannel bus 5. The interface employs SONET framers of the type described in T. J. Robe and K. A. Walsh, "A SONET STS-3c User-Network Interface IC," *Proceedings, Custom Integrated Circuits Conference*, San Diego, Cal. (May, 1991).

Figure 2:
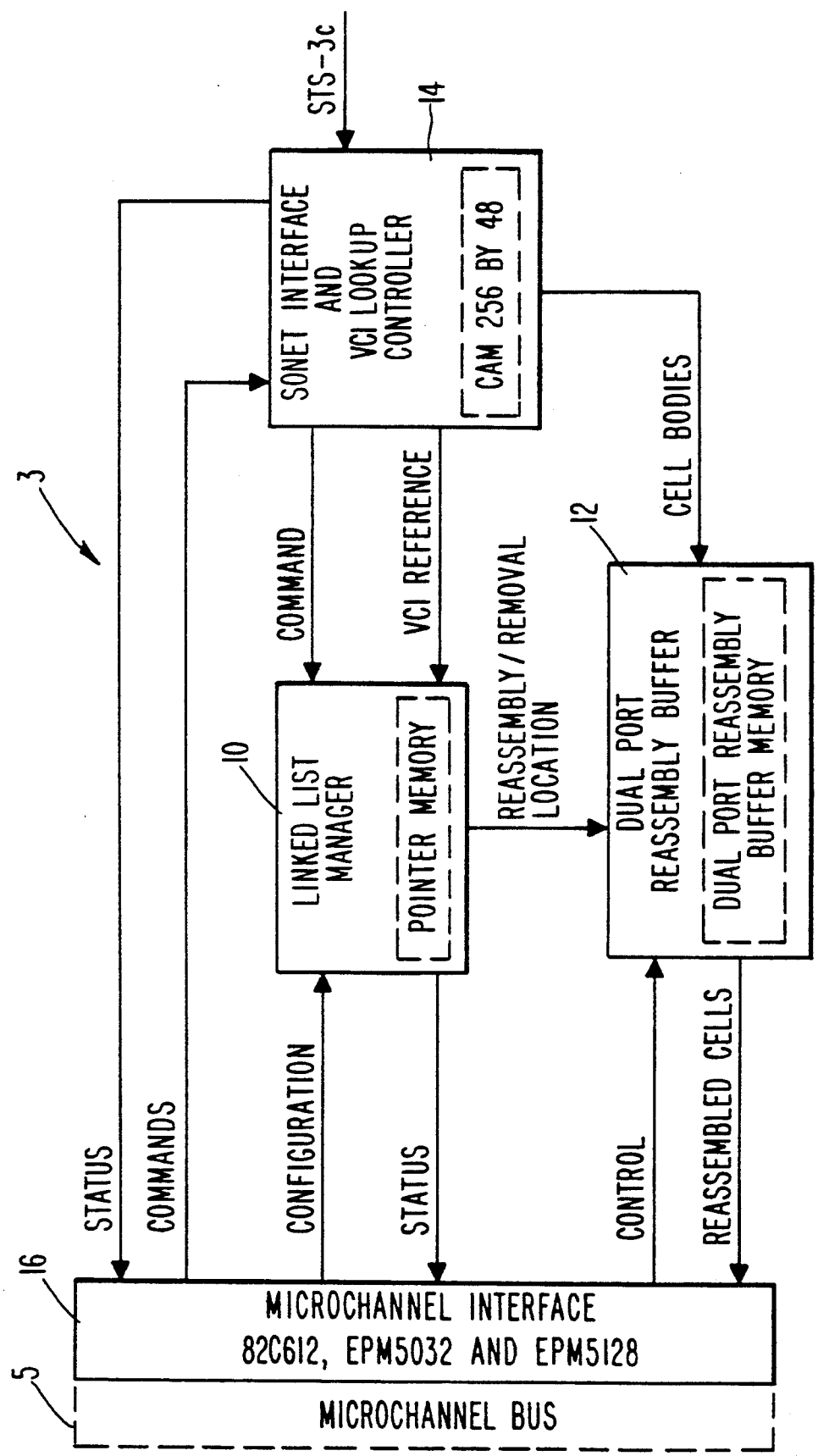
FIG. 2 is a block diagram of the Reassembler 3 of the computer network depicted in FIG. 1.

Referring now to FIG. 2, which provides an overview of the Reassembler 3, the three boxes 10, 12, 14 respectively labeled Linked List Manager, Dual Port Reassembly Buffer and SONET Interface and VCI Lookup Controller are capable of concurrent operation once they are initialized and configured. This concurrent operation may be exploited to allow reassembly of an ATM cell in much less than the 2.7 microsecond cell transmission time.

ATM cells are received by the SONET Interface and VCI Lookup Controller block 14. Block 14 splits the cells' headers from the corresponding cell bodies and passes the VCIs to the Linked List Manager 10 and the cell bodies to the Dual Port Reassembly Buffer 12. The Linked List Manager 10 creates a linked list for each VCI that identifies the locations in the Dual Port Reassembly Buffer 12 of all cell bodies associated with that VCI.

Figure 3:
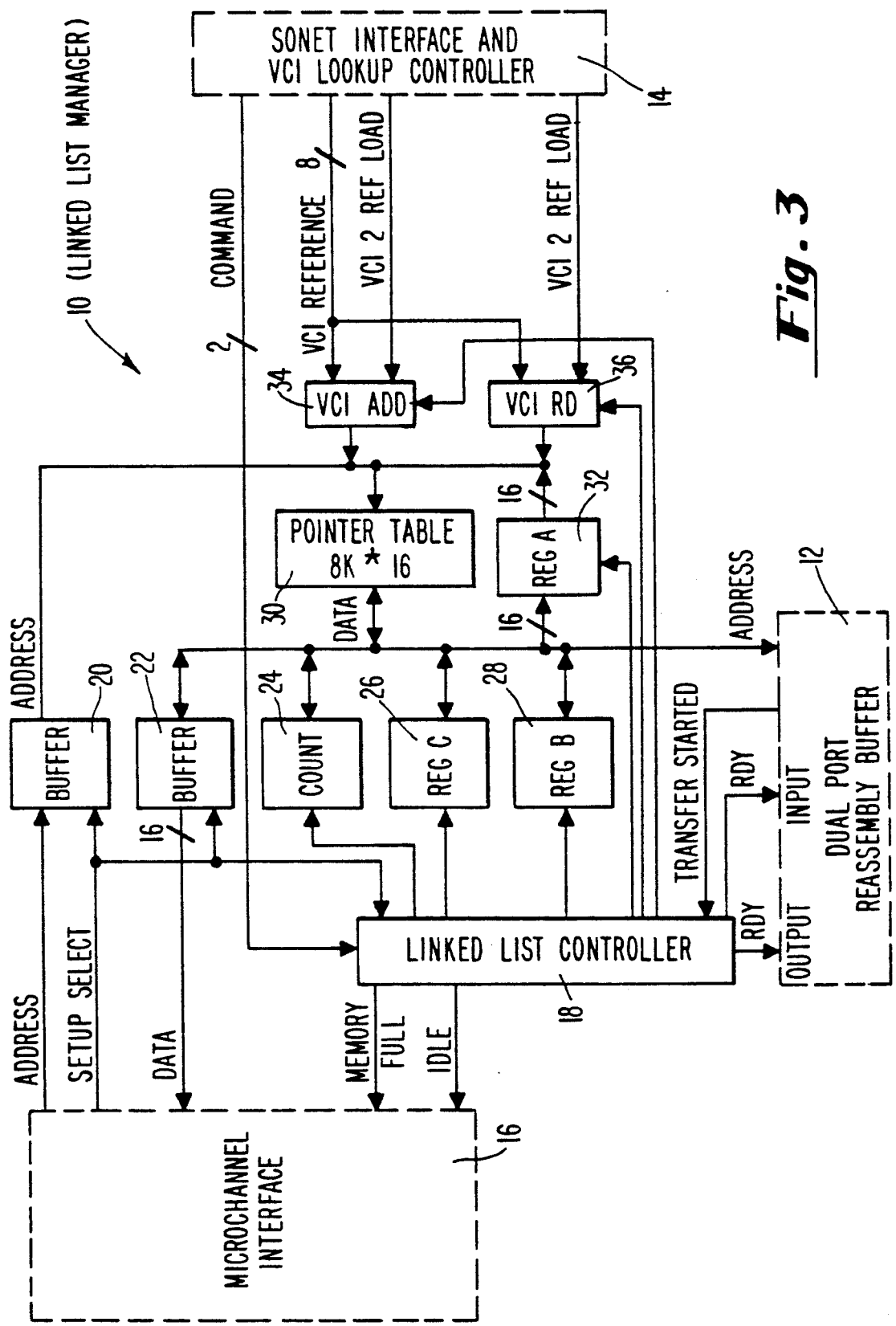
FIG. 3 is a block diagram of the Linked List Manager 10 of the Reassembler 3.

FIG. 3 is a block diagram of the Linked List Manager 10. The Linked List Manager 10 is capable of performing a number of operations on the linked list data (depicted in FIG. 3B) to effect reassembly. The use of linked list data structures allows memory to be dynamically assigned to incoming ATM cells and provides a first in-first out (FIFO) queue for the cells of a particular VCI. The memory allocation is dynamic because incoming cells are placed into nodes that are removed from a free list (discussed below) and added to the linked list for the particular VCI. In this way, VCIs that are more active are allotted more memory than less active VCIs. Moreover, memory may be deallocated as soon as a cell body has been read. This is accomplished by transferring the node back to the free list. The FIFO queuing characteristic of the linked list structure is important because the order of cells of a particular VCI must be maintained.

The linked list data consists of pointers and cell counts. The cell bodies are stored separately in the Dual Port Reassembly Buffer 12, which is described below. The cell body data is separated from the linked list data to minimize the amount of data movement. This separation is particularly important because it allows linked list management and data movement operations to be carried out in parallel. The separation of the linked list and cell body data will become even more important as the network speed is increased because it limits the degree to which memory bandwidth limitations can throttle the interface.

Figure 5:
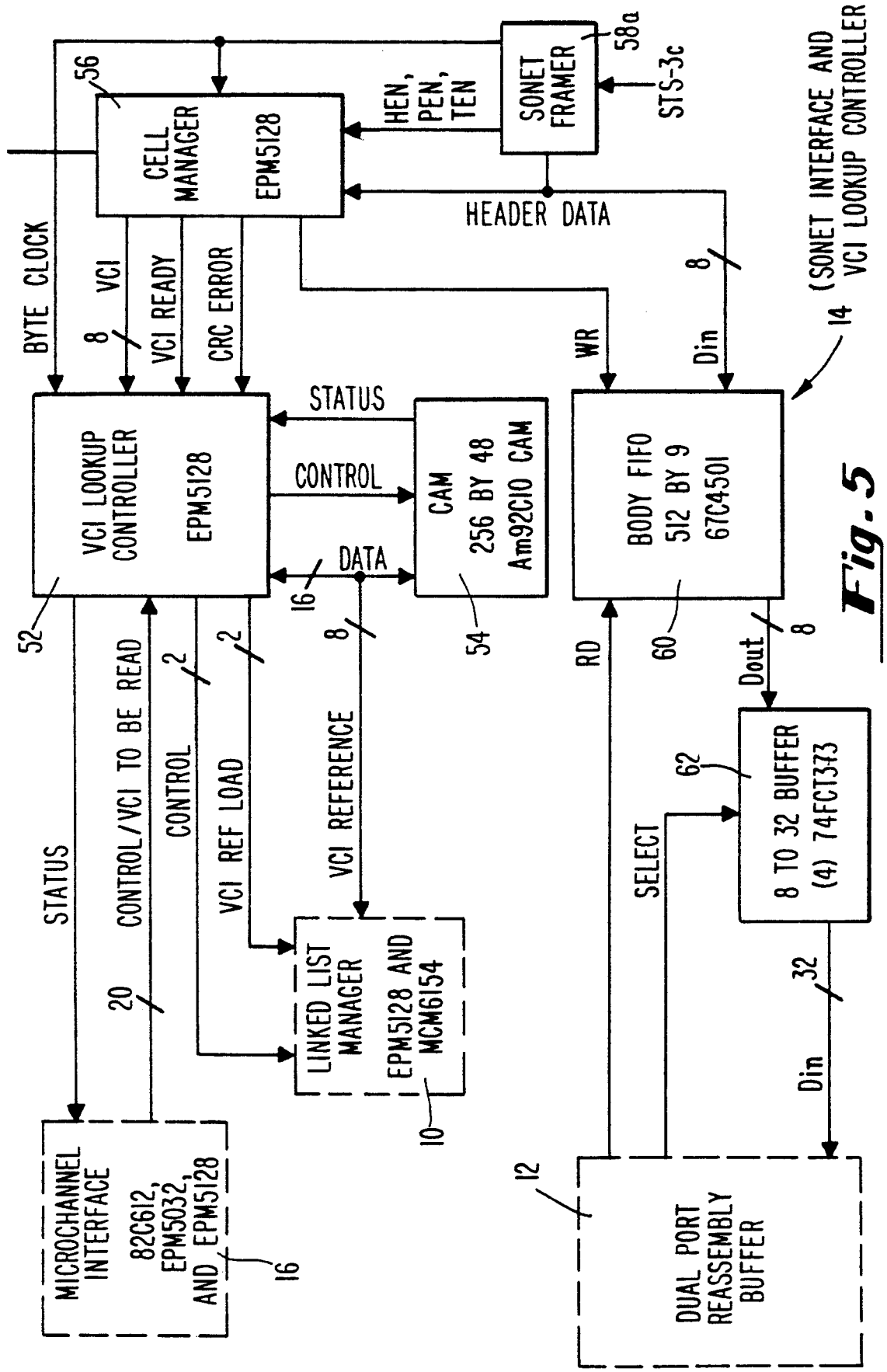
FIG. 5 is a block diagram of the SONET Interface and VCI Lookup Controller block 14 of the Reassembler 3.

The Linked List Manager 10 receives references to and commands for the manipulation of a particular VCI from the VCI Lookup Controller 52 (which is part of block 14, FIG. 5). It also provides status information for the host 4 (FIG. 1) and addresses in the Reassembly Buffer 12 to which data is to be moved.

The Linked List Manager 10 is composed of a Linked List Controller 18, buffers 20, 22 (used for configuration), counter 24, and registers 26, 28, 32, 34, 36, which are used in managing the linked lists, and a Pointer Table memory 30 of 8192 (8K) words, which is used to store the linked list data necessary for reassembly. The Linked List Controller 18, buffers 20, 22, counter 24, and registers 26, 28, 32, 34, 36 are provided by an EPM5128 programmable logic device in the preferred embodiment; the Pointer Table memory 30 is composed of two 8K by 48 MCM6164-45C static random access memories (RAMs).

All of the nodes are assembled into a linked list, known as the free list, during initialization. Operation of the host interface 1 is suspended during initialization, during which all pointers and counters used to keep track of the linked lists are zeroed. Initialization is performed by the host 4 by requesting a setup state and writing the appropriate configuration data to buffers 20, 22.

The free list is a linked list of nodes that are not currently assigned to a VCI. The free list is defined by the values stored in locations 2048 and 2049 of the Pointer Table memory 30 (FIG. 3B), which represent the addresses of the first and last free nodes in the free node linked list.

Four operations may be performed by the Linked List Manager 10 after initialization:
1. Cells may be added to the linked list for a particular VCI.
2. Cells may be removed from a VCI's linked list.
3. A VCI may be cleared, returning all of its nodes to the free list.
4. A cell count for a VCI may be obtained and returned to the host.

Figure 4:
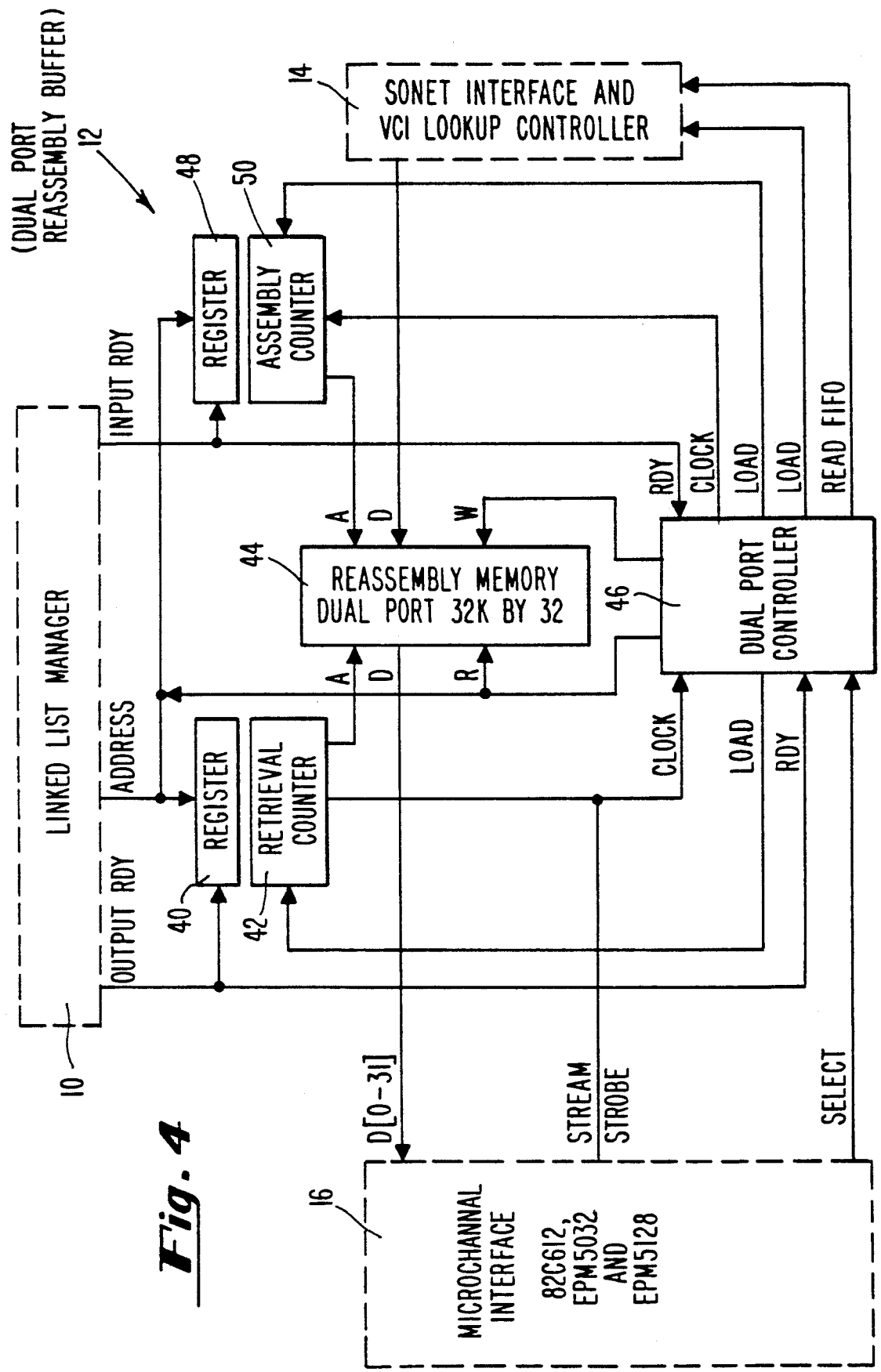
FIG. 4 is a block diagram of the Dual Port Reassembly Buffer 12 of the Reassembler 3.

The first two operations pass the Reassembly Memory 44 address of the cell body that is to be affected to the Dual Port Controller 46 (44 and 46 part of the Dual Port Reassembly Buffer 12 and are shown in FIG. 4).

The count and linked list associated with that VCI are also updated.

A first portion (the first 1K (1024) words) of the Pointer Table memory 30 comprises a series of storage locations for each of the 256 possible VCIs. This structure is depicted in FIG. 3B. For each VCI, the pointer to the newest cell received (the last cell) is stored in a first location, the pointer to the oldest cell (first cell) is stored in a second location, and the current count of cells for the particular VCI is stored in a third location. The respective pointers point to locations in the linked lists, which are located in the last 4K of the Pointer Table memory 30. It is useful to have access to a count of the number of cells available for a particular VCI in order to gauge the volume of traffic on that VCI.

A second portion (the last 4K words, locations 4096-8192) of the Pointer Table memory 30 comprises sets of locations for storing pointers used for the nodes of the linked lists. Each node physically comprises two consecutive memory locations beginning on every even address in the 4K to 8K segment of the Pointer Table memory 30. The first location of each node stores the address in (or pointer to) the Reassembly Memory 44 (FIG. 4) where the cell body associated with that node is stored. The value of the first pointer is undefined if the node is in the empty list (i.e., if the node has not been allocated to a VCI). The second location of each node stores a pointer to the next node in the linked list. The value is zero if the node is the last node in the linked list.

Figure 3A:
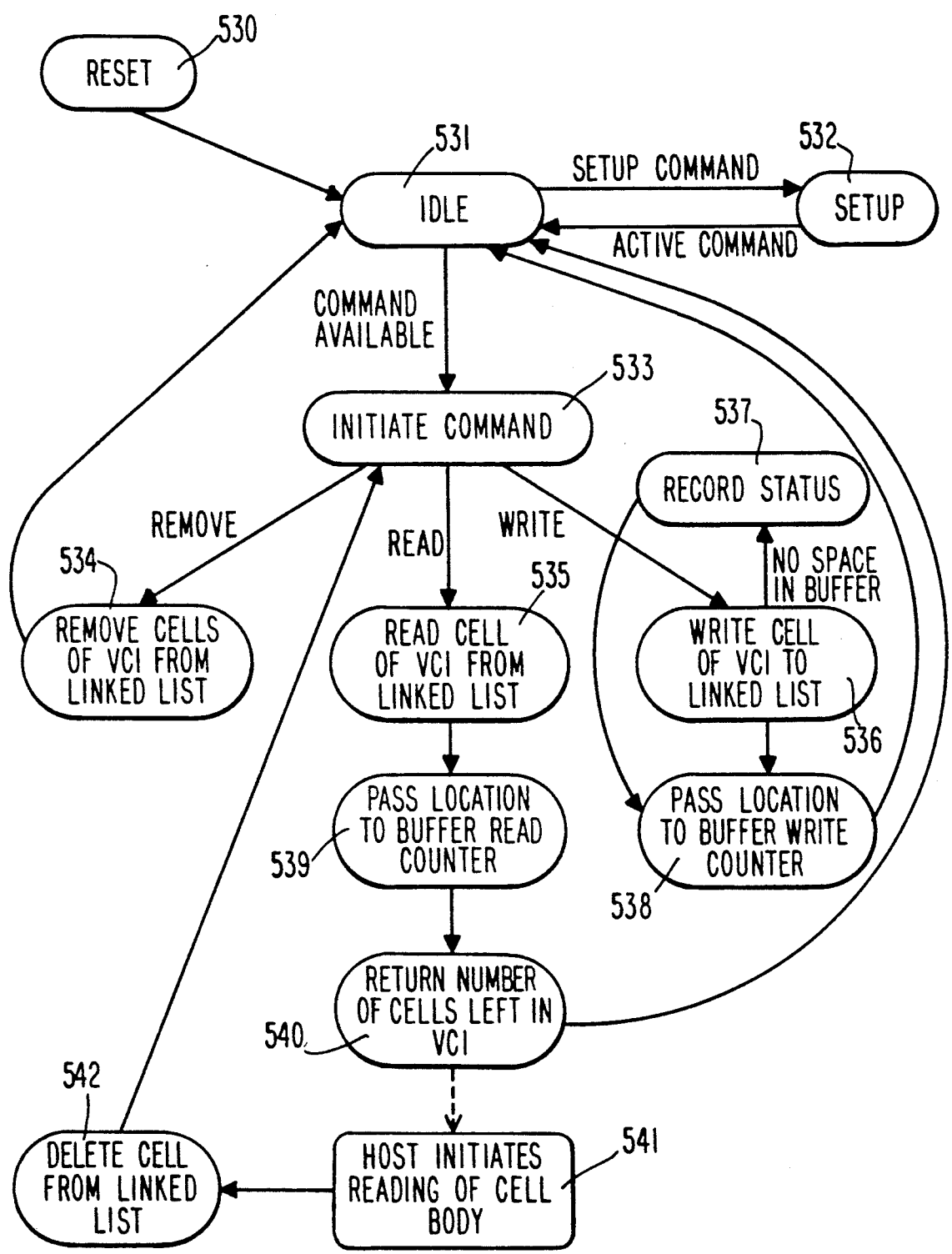
FIG. 3A is a state machine diagram for the Linked List Controller 18 of the Linked List Manager 10.

FIG. 3A is a state machine diagram for the Linked List Controller 18.

The Linked List Controller assumes an idle state (state S31) after reset (state S30).

The Linked List Controller 18 moves to the setup state (S32) if the host 4 issues a setup command and specifies setup data to be written into the Pointer Table memory 30.

The Linked List Controller 18 moves to the initiate command state (S33) when commands requesting operation on the linked list of a particular VCI are passed from the VCI Lookup Controller 52 (FIG. 5). Those commands include commands for removing a cell, writing (i.e., adding) a cell and reading a cell from a linked list for a particular VCI.

The Linked List Controller 18 moves to state S34 when a remove command is issued. In state S34 the linked list associated with the VCI to be removed is appended to the free list.

The Linked List Controller 18 moves to state S35 when a read command is issued. In state S35 the Linked List Controller 18 locates the first cell reference structure (oldest cell) in the linked list associated with the VCI and determines the location of the cell body in the Reassembly Memory 44.

The location of the cell body is passed to the Dual Port Controller 46 (FIG. 4) in state S39 and the count (number of cells in the VCI's linked list) is passed to the host 4 in state S40. Providing the host a count of the cells associated with a particular VCI allows the level of activity of that VCI to be judged.

After the count has been provided to the host 4, the Linked List Controller 18 initiates the operation of a second state machine, which starts at state S41, and then returns to the idle state (S31).

The second state machine monitors the host 4 to ensure that the cell body has been read (state S41) before the entry in the linked list is deleted in state S42. The count associated with the VCI is decremented when the cell is deleted from the linked list. The location of the next node or cell in the linked list is requested once the cell body has been read. The automatic selection of the next node will be overridden, however, if the host should instead decide to read another VCI. The automatic reading of the next node of a particular VCI significantly enhances the performance of the Reassembler 3 since a new transfer into the host need not be initiated for each cell body.

The Linked List Controller 18 moves to state S36 when a write command is issued. In state S36 the Linked List Controller 18 writes a new cell body to a reassembly list and removes the first cell reference structure in the free list and appends it to the end of the list for the appropriate VCI.

An error is set in state S37 if the free cell list is empty.

In state S38, the pointer into the Reassembly Memory 44 (FIG. 4), which is contained in the cell structure, is passed to Controller 46 and the cell count for that VCI is incremented. The Linked List Controller 18 thereafter returns to the idle state (S31) to await the next command.

FIG. 4 is a block diagram of the Dual Port Reassembly Buffer 12 of the Reassembler 3. The Dual Port Reassembly Buffer 12 is used to reassemble the cell bodies arriving from the network and store them until the host 4 is ready to process them. When the Linked List Manager 10 has determined the location in the Reassembly Memory 44 for a new cell, that location is written into a register 48, which is associated with an Assembly Counter 50. The cell body is moved, under the control of the Dual Port Controller 46 (which is implemented by an EPM5128 programmable logic device), from the body FIFO 60 of block 14 (FIG. 5) to where it is temporarily stored in the 32K by 32 Reassembly Memory 44 (which is composed of four MCM6206P45 static RAM devices) at addresses generated by the Assembly Counter 50. If the Linked List Manager 10 determines the address for another transfer before the Dual Port Reassembly Buffer 12 completes its current transfer, the address of the next cell body to be transferred is stored in Registers 40, 48 until the Dual Port Reassembly Buffer 12 can attend to the next requested transfer.

The Dual Port Reassembly Buffer 12 also provides a means for transferring reassembled data to the host 4. The Linked List Manager 10 provides the address in the Reassembly Memory 44 that contains the cell body that is to be transferred to the host 4. The data stream transfer may be initiated when the Reassembly Memory address is loaded into Retrieval Counter 42. As soon as a streaming strobe has been activated, the Retrieval Counter 42 increments its count on the rising edge of the streaming strobe and the Dual Port Controller 46 reads the appropriate word from Reassembly Memory 44 and places it on the MicroChannel bus 5 via the MicroChannel interface 16.

Figure 4A:
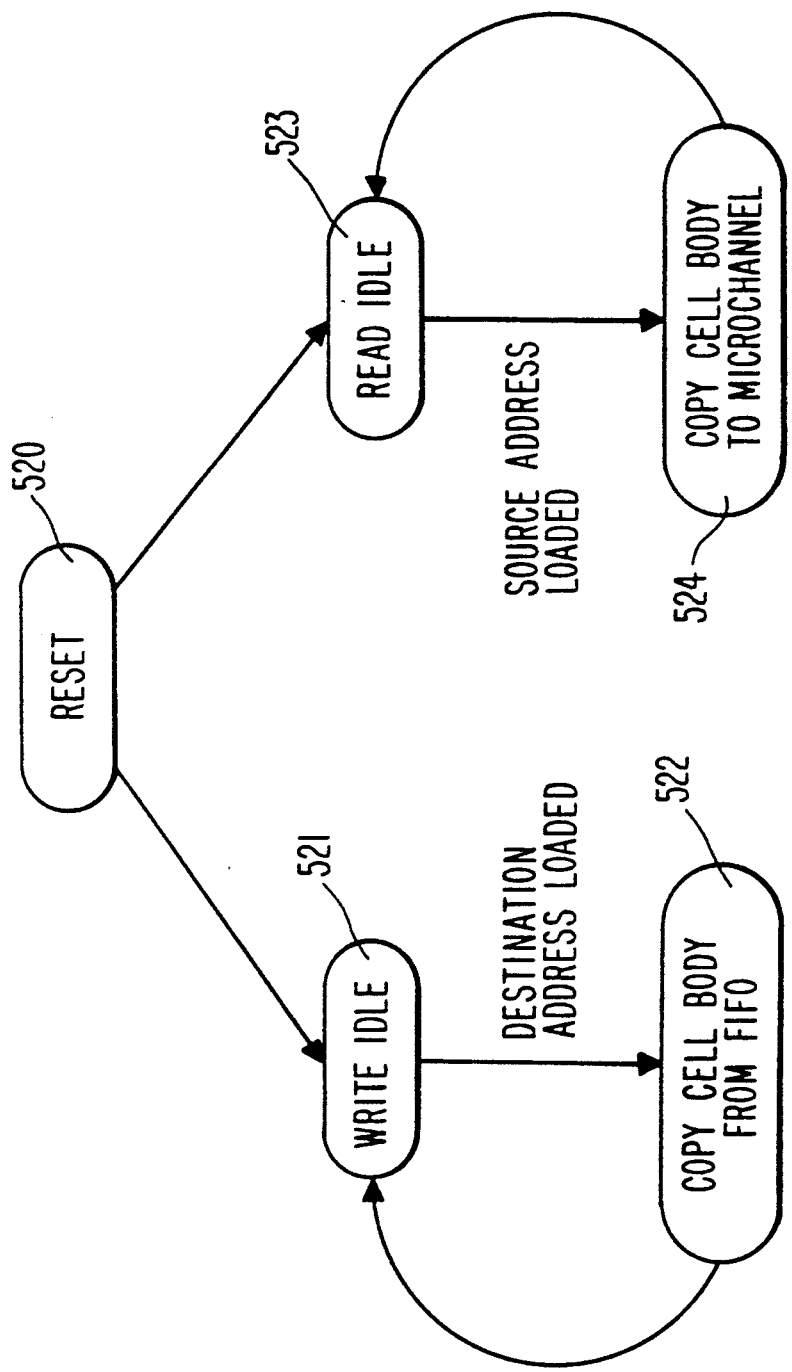
FIG. 4A is a state machine diagram for the Dual Port Reassembly Buffer 12.

FIG. 4A is a state machine diagram for the two state machines (the read and write state machines) of the Dual Port Controller 44.

Each of the two state machines enters its respective idle state (states S21, S23) after reset (state S20).

The Dual Port Controller 46 begins a transfer as soon as it receives a source or destination address from the Linked List Manager 10. If a read is requested, twelve words (48 bytes, one ATM cell) are transferred one at a time on the falling edge of the streaming strobe (state S24). If a write is requested, 48 bytes are read from the body storage FIFO 60 (FIG. 5) and are written a word at a time into the Reassembly Memory 44 (state S22). The Dual Port Controller 46 arbitrates simultaneous read and write requests. Preference is given to read operations.

FIG. 5 is a block diagram of the SONET Interface and VCI Lookup Controller block 14. Block 14 operates as follows:

1. The Cell Manager 56 (composed of an EPM5128 erasable programmable logic device (EPLD)) splits the header from the cell body and calculates the checksum of the header to detect possible header corruption.
2. The 16-bit VCI (as specified in the ATM Standard (see CCITT Study Group XVIII, "Meeting Report of Subwork Party 8/1 ATM," Document 14-E (June 1989))) is extracted from the header and loaded into a register (not shown) while the body is loaded into the Body FIFO 60 (composed of a 67C4501 RAM-based FIFO).
3. The VCI lookup content addressable memory (CAM) 54 (composed of an Advanced Micro Devices Am99C10 CAM) locates the VCI and determines its linked list reference location.
4. The address of the reference location may be passed to the Linked List Manager 10 along with an indication of which linked list operation is to be performed.

The CAM 54 is a 256 by 48 memory device, thus 256 VCIs may be reassembled simultaneously. That number may be scaled upward by using a different or additional CAMs.

The VCI Lookup Controller 52 (an EPM5128 EPLD) adds the VCI to the CAM 54 if the VCI has not been used before. The VCI Lookup Controller 52 also locates VCIs that the host 4 is interested in moving from the Reassembly Buffer 12 into main memory (not shown) and removes unwanted VCIs from the CAM 54 under the direction of the host. In addition, the VCI Lookup Controller 52 provides a translation between the 16 bit VCI and a pointer into the Pointer Table memory 30.

Figure 5A:
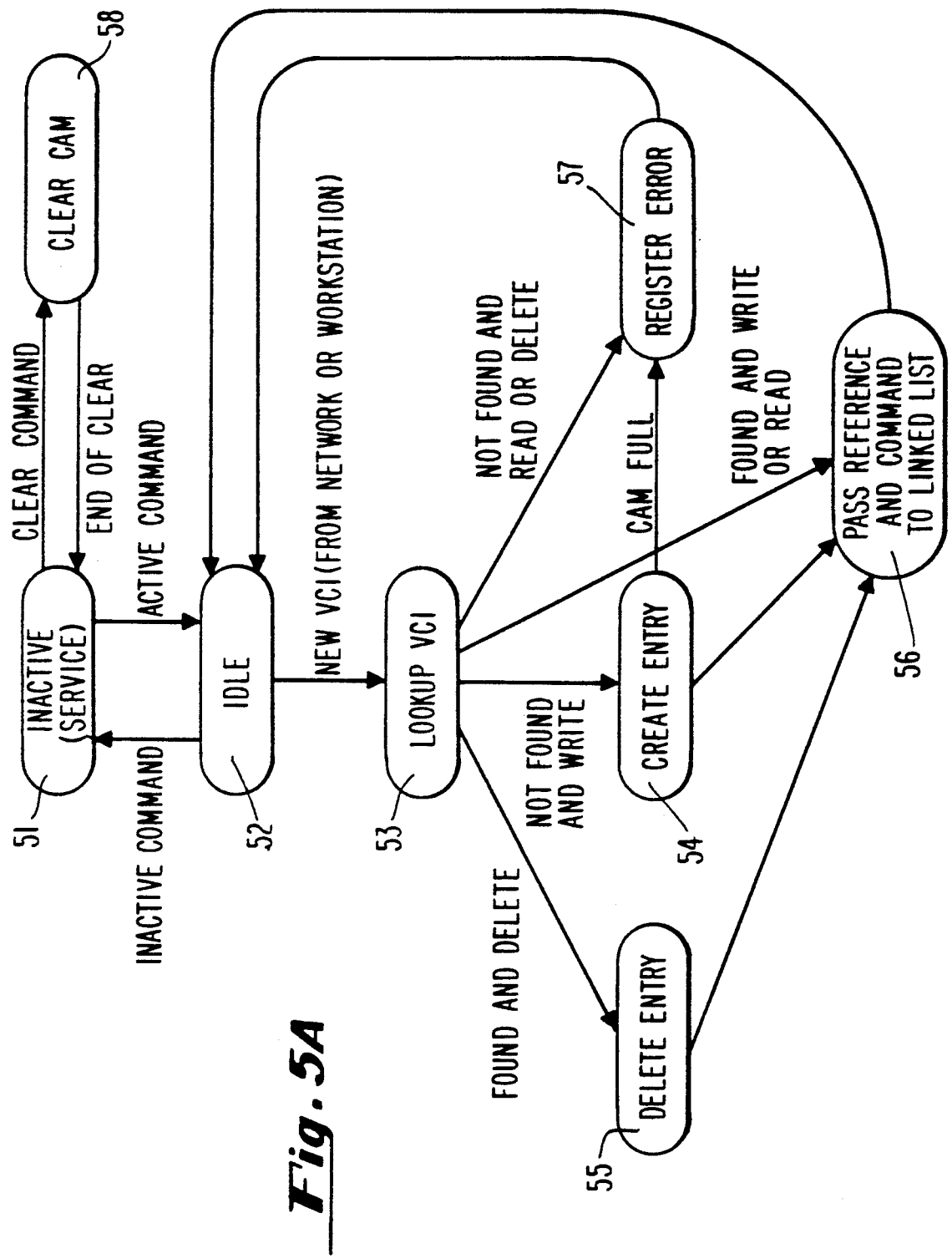
FIG. 5A is a state machine diagram for the VCI Lookup Controller 52 of block 14.

The operation of the VCI Lookup Controller 52 is represented by the state diagram of FIG. 5A.

The VCI Lookup Controller 52 assumes an inactive state (state S1) upon reset. From the inactive state (S1), commands from the MicroChannel interface 16 cause the Controller 52 to either clear the CAM 54 (state S8) or enter the idle state (state S2).

Controller 52 remains in the idle state (S2) until either the MicroChannel interface 16 or the Cell Manager 56 sends a signal indicating that a VCI must be accessed, in which case it moves to state S3.

In state S3 a VCI lookup is performed. VCI lookups are performed, e.g., so that the host 4 may reassemble cells or delete a particular VCI from the CAM 54 and its associated linked list, or so that the Cell Manager 56 may look up a VCI to reassemble a cell that has been received from the network. A VCI lookup may be accomplished in 200 ns.

State S7 is entered and an error is registered if a read or delete command was sent and the VCI cannot be found in the CAM 54; thereafter the VCI Lookup Controller 52 returns to the idle state (state S2).

If the VCI is to be deleted and the VCI is found, the entry is deleted from the CAM 54 (state S5) and a reference for the VCI and the delete command are passed to the Linked List Manager 10 (state S6). Controller 52 then returns to the idle state (state S2).

If a read is to be performed and the VCI is found, the reference and command are passed to the Linked List Manager 10 (state S6) after the VCI is verified to be active. Controller 52 then returns to the idle state (state S2).

The final option is to write a cell to a particular VCI. If a write command is issued and the VCI is not found upon lookup, a new entry is created in the CAM 54 (state S4), provided that room is available. An error is registered if the CAM 54 is full (state S7). The command and reference are passed to the Linked List Manager 10 (state S6) after the new entry has been created. If the VCI to be written is already present in the CAM 54, the reference and command are passed directly to the Linked List Manager 10 (state S6), i.e., state S4 is bypassed. Controller 52 then returns to the idle state (state S2).

Figure 5B:
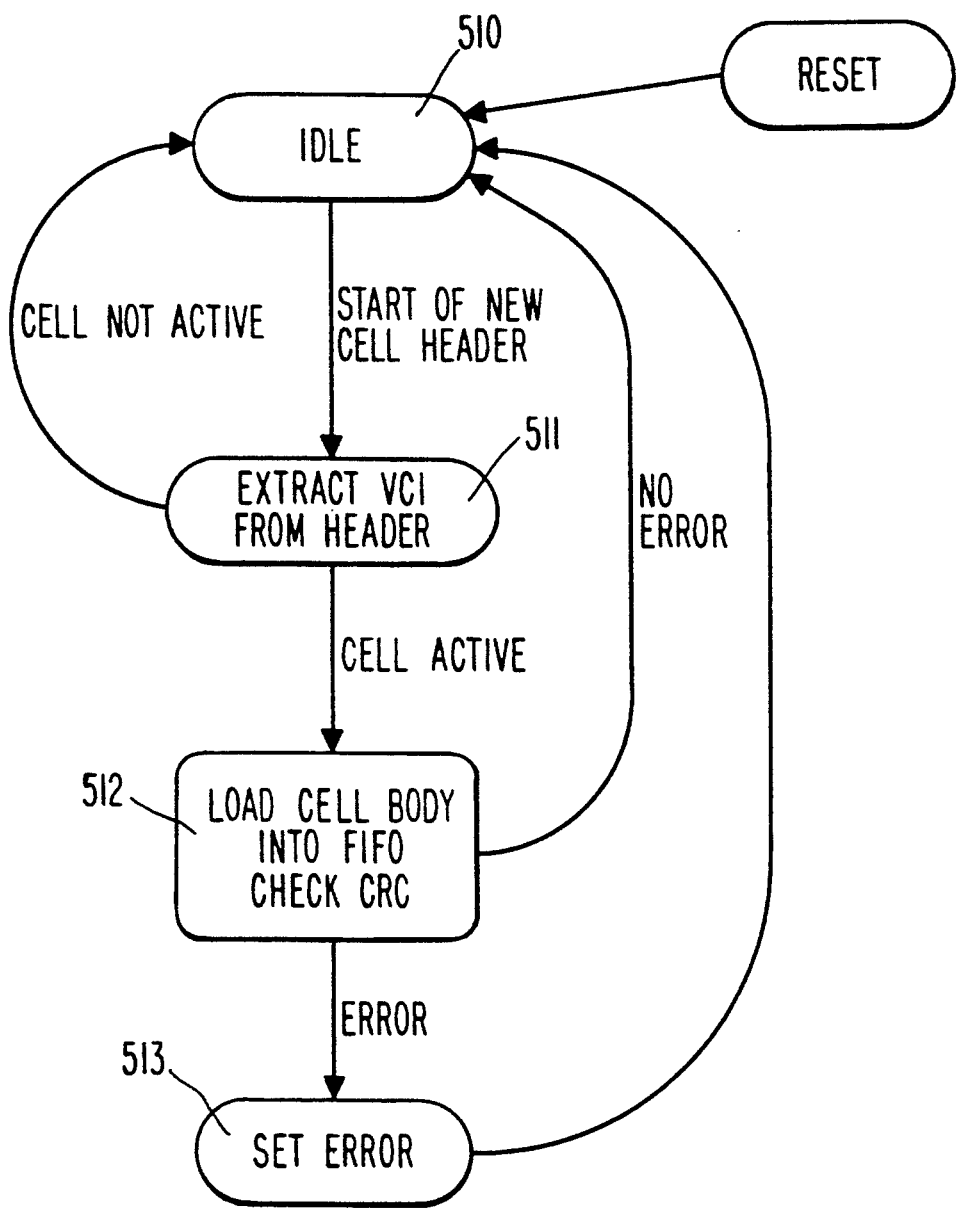
FIG. 5B is a state machine diagram for the Cell Manager 56 of block 14.

The Cell Manager 56 (which is composed of an EPM5128 Programmable Logic Device) processes cells as they are received from the SONET Framer 58a interface to the network. The state diagram of FIG. 5B depicts the operation of the Cell Manager 56.

The initial state of the Cell Manager 56 is idle (state S10). The idle state is maintained until the SONET Framer 58a indicates, via control lines Hen, Pen and Ten, that a new cell is being received from the network. The cell's header is loaded into a set of five octal registers (not shown) as the cell is received.

In state S11, the VCI, a 16 bit quantity, is extracted from the cell header to determine if the cell is active. An empty cell is signified by a predefined value of the VCI (e.g., zero).

In state S12, a cyclic redundancy check (CRC) is simultaneously made, if the cell is active, by computing the polynomial specified in the CCITT ATM standard $(X^8+X^2X+1)$ using the first four bytes of the header and comparing the result with the fifth byte of the header. The cell is marked for discard if corruption of the header is detected. While the CRC is being performed, the body of the cell is simultaneously loaded into the Body FIFO 60. A VCI ready signal is provided to the VCI Lookup Controller 52 once the CRC has been computed and compared, which takes approximately 1.6 ms.

A CRC error is indicated in state S13 if header corruption is detected.

Figure 6:
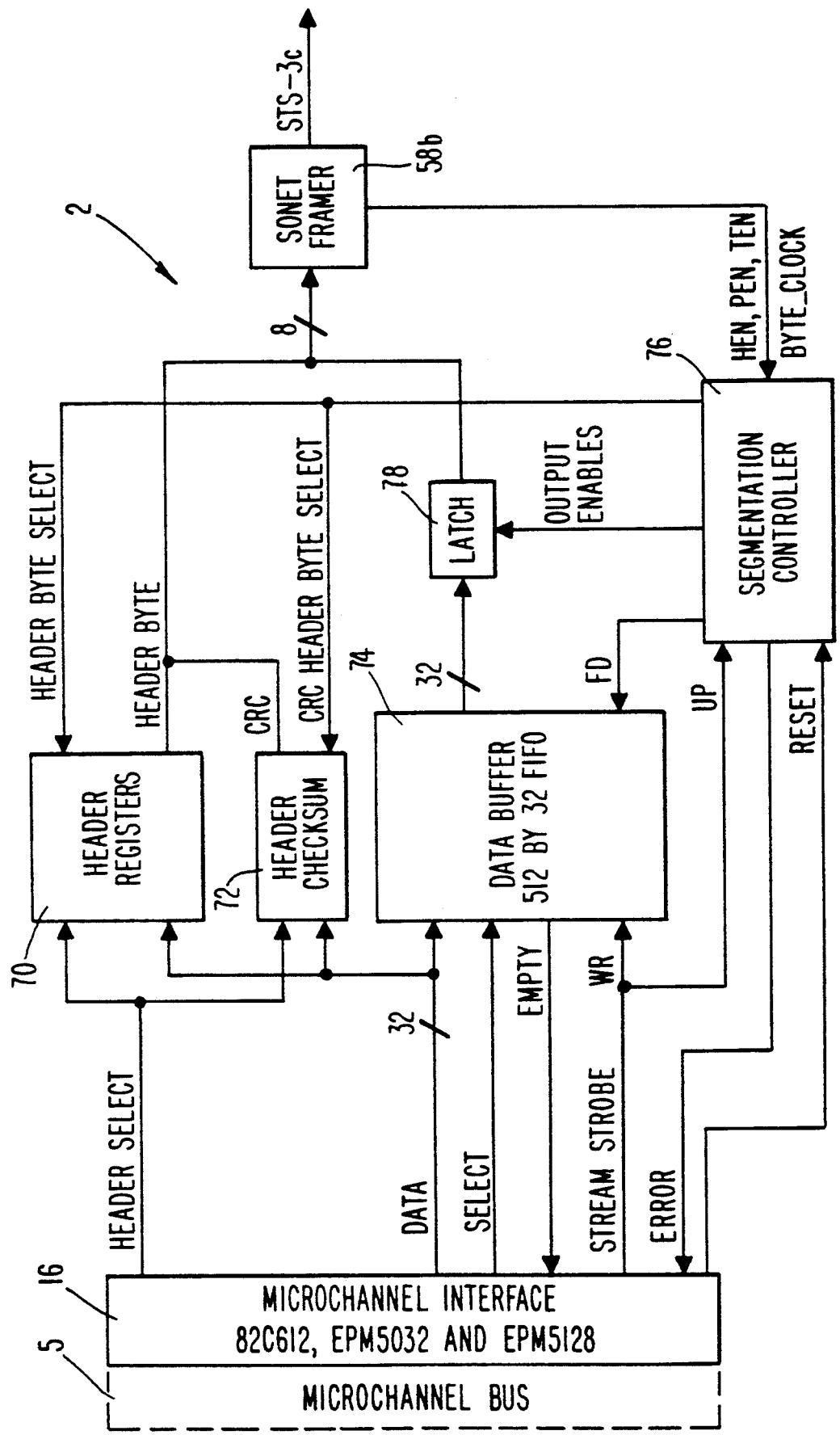
FIG. 6 is a block diagram of the Segmenter 2 of the computer network of FIG. 1.

FIG. 6 is a block diagram of the Segmenter/Transmitter (Segmenter) 2 of the host interface 1. The operation of the Segmenter is as follows: The first four bytes of the ATM header are composed by the host 4 for the particular VCI that is to be transmitted. That header is then written into the header registers 70. A checksum is calculated and written into the register for the fifth header byte 72. Data for that VCI is then streamed into the FIFO buffer 74. As 48 bytes (one ATM cell body) arrive, the Segmentation Controller 76 (an EPM5128) combines the header and cell body, passing the completed cell to the SONET Framer 58b. The host is responsible for alternating VCIs to avoid congestion of the Sunshine switching fabric (not shown). Latch 48 breaks 32-bit words read from Data Buffer 74 into bytes for the SONET Framer 58b.

A number of assumptions have been made about the host software, particularly the host operating system's active management of the host interface 1. Active management is assumed because of the following:

1. Workstations are rarely a shared resource, unlike mainframes, supercomputers or minicomputers.

2. Egalitarian scheduling policies have made real-time operation difficult.
3. Interrupt-handling overhead is large (e.g., a save/restore of the RS/6000's registers requires 256 bytes, versus the 48 bytes required for the ATM payload) and causes a significant reduction in cache effectiveness. Full interrupt service per ATM cell would severely limit the host's network bandwidth.
4. The general solution to this problem is to use more aggressive I/O device management policies and scheduling strategies, e.g., only using an interrupt as an event indicator. Transfers of bursts of ATM cells would be accomplished in a polled manner (bursts of ATM cells will arise as a consequence of the mismatch between some computer data units (e.g., pages) sized as multiples of 1024 bytes and the ATM payload of 48 bytes).

Many modifications of the preferred embodiment described in the foregoing specification are within the true scope of the invention as recited in the following claims. For example, the invention is not limited to the particular components specified, nor is it limited to an interface between an IBM RS/6000 workstation and a telecommunications network. The invention could be applied to an interface between a network and a network element other than a computer, e.g., a video device, printer, or even another network. Moreover, the term cell as used in the following claims is defined as any prescribed quantum of data, i.e., it is not necessarily limited to the 53 bytes specified above.

What is claimed:

1. A reassembler for reassembling received data that has been segmented into a plurality of cells each of which comprises a virtual channel identifier (VCI) and a cell body, comprising:
   (a) first means for separating each cell body from its corresponding VCI and determining respective linked list reference addresses for the VCIs;
   (b) Reassembly Buffer means for storing said cell bodies; and
   (c) Linked List Manager means for storing linked list data indicative of addresses at which said cell bodies are stored in said Reassembly Buffer means.

2. A reassembler as recited in claim 1, wherein said Linked List Manager means comprises:
   (i) Pointer Table means for storing said linked list data; and
   (ii) Linked List Controller means for removing linked list data from said Pointer Table means, reading linked list data from said Pointer Table means and writing linked list data to said Pointer Table means.

3. A reassembler as recited in claim 1, wherein said Reassembly Buffer means comprises:
   (i) Reassembly Memory means for storing said cell bodies; and
   (ii) Dual Port Controller means for writing/reading cell bodies to/from said Reassembly Memory means.

4. A reassembler as recited in claim 1, wherein said first means comprises:
   (i) Cell Manager means for separating each cell body from its corresponding VCI and detecting whether said VCI has been corrupted;
   (ii) CAM means for storing said VCIs and providing pointers into said linked list data; and
   (iii) VIC Lookup Controller means for writing said VCIs to said CAM means.

5. A reassembler as recited in claim 1, wherein said first means, Reassembly Buffer means and Linked List Manager means are adapted for parallel operation.

6. An interface for coupling a computer to a telecommunications network, comprising:
   (a) reassembler means for receiving and reassembling data that has been segmented into a plurality of asynchronous transfer mode (ATM) cells each of which comprises a virtual channel identifier (VCI) and a cell body, comprising:
      (i) first means for separating each cell body from its corresponding VCI and determining respective linked list reference addresses for the VCIs;
      (ii) Reassembly Buffer means for storing said cell bodies; and
      (iii) Linked List Manager means for storing linked list data indicative of addresses at which said cell bodies are stored in said Reassembly Buffer means; and
   (b) Segmenter means for segmenting data into a plurality of ATM cells.

7. An interface as recited in claim 6, wherein said Linked List Manager means comprises:
   (i) Pointer Table means for storing said linked list data; and
   (ii) Linked List Controller means for removing linked list data from said Pointer Table means, reading linked list data from said Pointer Table means and writing linked list data to said Pointer Table means.

8. An interface as recited in claim 6, wherein said Reassembly Buffer means comprises:
   (i) Reassembly Memory means for storing said cell bodies; and
   (ii) Dual Port Controller means for writing/reading cell bodies to/from said Reassembly Memory means.

9. An interface as recited in claim 6, wherein said first means comprises:
   (i) Cell Manager means for separating each cell body from its corresponding VCI and detecting whether said VCI has been corrupted;
   (ii) CAM means for storing said VCIs and providing pointers into said liked list data; and
   (iii) VCI Lookup Controller means for writing said VCIs to said CAM means.

10. A reassembler as recited in claim 6, wherein said first means, Reassembly Buffer means and Linked List Manager means are adapted for parallel operation.

11. A system, comprising:
   (a) a network element;
   (b) a telecommunications network; and
   (c) Reassembler means, coupled between said network element and said network, for reassembling received data that has been segmented into a plurality of cells each of which comprises a virtual channel identifier (VCI) and a cell body, comprising:
      (i) first means for separating each cell body from its corresponding VCI and determining respective linked list reference addresses for the VCIs;
      (ii) Reassembly Buffer means for storing said cell bodies; and
      (iii) Linked List Manager means for storing linked list data indicative of addresses at which said cell bodies are stored in said Reassembly Buffer means.

12. A system as recited in claim 11, wherein said network element is a network.

* * * * *

UNITED STATES PATENT AND TRADEMARK OFFICE
CERTIFICATE OF CORRECTION

PATENT NO. : 5,274,768
DATED : December 28, 1993
INVENTOR(S) : Brendan S. Traw et al.

It is certified that error appears in the above-indentified patent and that said Letters Patent is hereby corrected as shown below:

At column 10, line 36, $(X^8 + X^2X + 1)$ should be --$(X^8 + X^2 + X + 1)$--

Signed and Sealed this

Twenty-third Day of August, 1994

Attest:

BRUCE LEHMAN

*Attesting Officer*  *Commissioner of Patents and Trademarks*